(12) United States Patent
Balsillie et al.

(10) Patent No.: US 7,578,474 B2
(45) Date of Patent: Aug. 25, 2009

(54) SEALED STRUCTURAL PASSENGER WINDOW ASSEMBLY AND METHOD OF FORMING SAME

(75) Inventors: Chris H Balsillie, Mukilteo, WA (US); Donald P Matheson, Redmond, WA (US); Jeffrey P Sandys, Shoreline, WA (US); Shawn M Pare, Woodinville, WA (US)

(73) Assignee: The Boeing Company, Chicago, IL (US)

( * ) Notice: Subject to any disclaimer, the term of this patent is extended or adjusted under 35 U.S.C. 154(b) by 281 days.

(21) Appl. No.: 11/143,287

(22) Filed: Jun. 2, 2005

(65) Prior Publication Data

US 2006/0284016 A1 Dec. 21, 2006

(51) Int. Cl.
*B64C 1/14* (2006.01)
(52) U.S. Cl. .................................. 244/129.3; 52/171.1
(58) Field of Classification Search .................. 52/208, 52/171.1, 171.3, 199, 200, 717.01, 717.02, 52/717.03, 716.1; 244/118.5, 119, 129.1, 244/129.3, 129.4
See application file for complete search history.

(56) References Cited

U.S. PATENT DOCUMENTS

| | | | | |
|---|---|---|---|---|
| 2,602,970 A | * | 7/1952 | Gouge | 52/1 |
| 3,429,530 A | * | 2/1969 | Hertel | 244/129.3 |
| 4,364,533 A | * | 12/1982 | Pompei et al. | 244/129.3 |
| 4,495,549 A | * | 1/1985 | Carlson et al. | 362/470 |
| 4,541,595 A | * | 9/1985 | Fiala et al. | 244/129.3 |
| 4,669,241 A | | 6/1987 | Kelly et al. | |
| 5,271,581 A | * | 12/1993 | Irish | 244/129.3 |
| 5,323,576 A | * | 6/1994 | Gumpert et al. | 52/200 |
| 5,467,943 A | * | 11/1995 | Umeda | 244/129.3 |
| 5,715,636 A | * | 2/1998 | Taylor | 52/308 |
| 5,988,566 A | | 11/1999 | Meyer et al. | |
| 6,034,353 A | * | 3/2000 | Demeester | 219/203 |
| 6,067,761 A | * | 5/2000 | Demeester | 52/208 |
| 6,168,112 B1 | * | 1/2001 | Mueller et al. | 244/129.3 |

(Continued)

FOREIGN PATENT DOCUMENTS

DE 4002514 A1 8/1990

(Continued)

*Primary Examiner*—Michael R Mansen
*Assistant Examiner*—Joseph W Sanderson
(74) *Attorney, Agent, or Firm*—Harness, Dickey & Pierce, P.L.C.

(57) ABSTRACT

A window assembly and method for use with a mobile platform, and particularly with commercial or military aircraft. The window assembly includes a composite window panel that is secured to the fuselage skin of the aircraft. A tempered glass fairing is used in connection with a retainer clip and a plurality of sealing components to seal the fairing over the window panel in a manner that provides a sealed air gap between the inner surface of the fairing and the outer surface of the window panel. The fairing and the sealed air gap help to thermally isolate the window panel from the significant ambient temperature changes that are encountered during flight of the mobile platform. The fairing also provides a hazard barrier to protect the composite window panel from impact by foreign objects during flight. The sealed air gap also helps to control deflection of the fairing to thus ensure that the fairing maintains an aerodynamic profile generally in accordance with the contour of the outer surface of the fuselage.

13 Claims, 4 Drawing Sheets

U.S. PATENT DOCUMENTS

| | | | |
|---|---|---|---|
| 6,561,460 B2 * | 5/2003 | Rukavina et al. | 244/129.3 |
| 6,592,077 B2 * | 7/2003 | Uhlemann et al. | 244/129.3 |
| 6,736,352 B2 * | 5/2004 | Bladt et al. | 244/129.3 |
| 6,783,099 B2 * | 8/2004 | Rukavina et al. | 244/129.3 |
| 6,789,765 B2 * | 9/2004 | Hopkins et al. | 244/129.3 |
| 6,889,938 B1 | 5/2005 | Nordman | |
| 6,915,988 B2 * | 7/2005 | Sanz et al. | 244/129.3 |

FOREIGN PATENT DOCUMENTS

| | | | |
|---|---|---|---|
| EP | 0 322 776 A | | 5/1989 |
| EP | 936139 A2 | * | 8/1999 |
| JP | 10036139 A | * | 2/1998 |
| JP | 2003034296 A | * | 2/2003 |

* cited by examiner

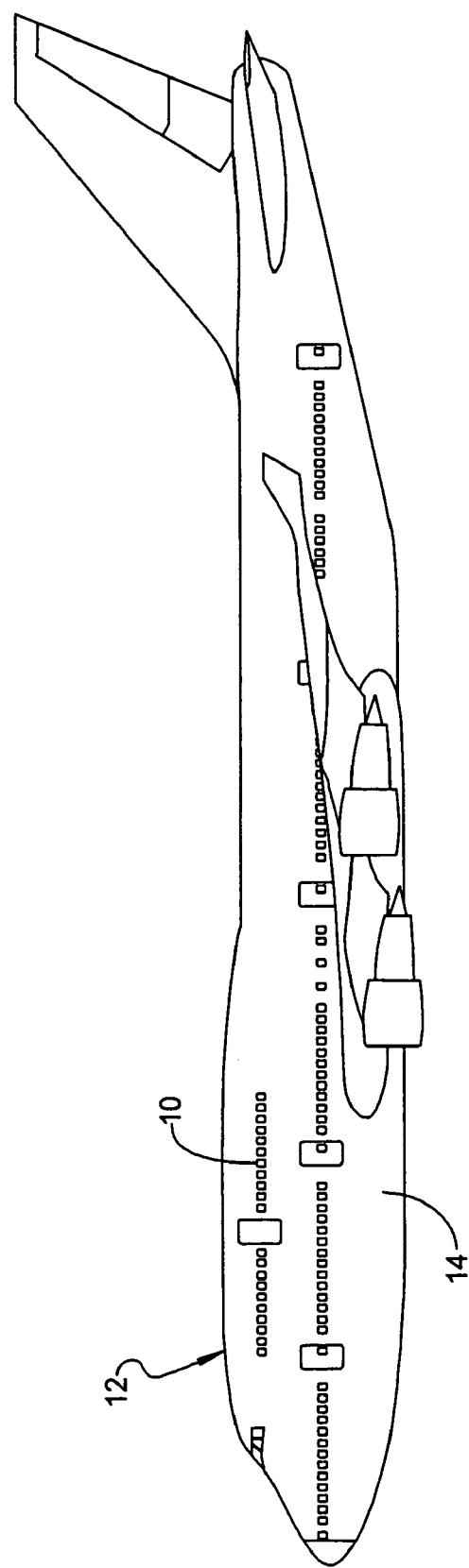

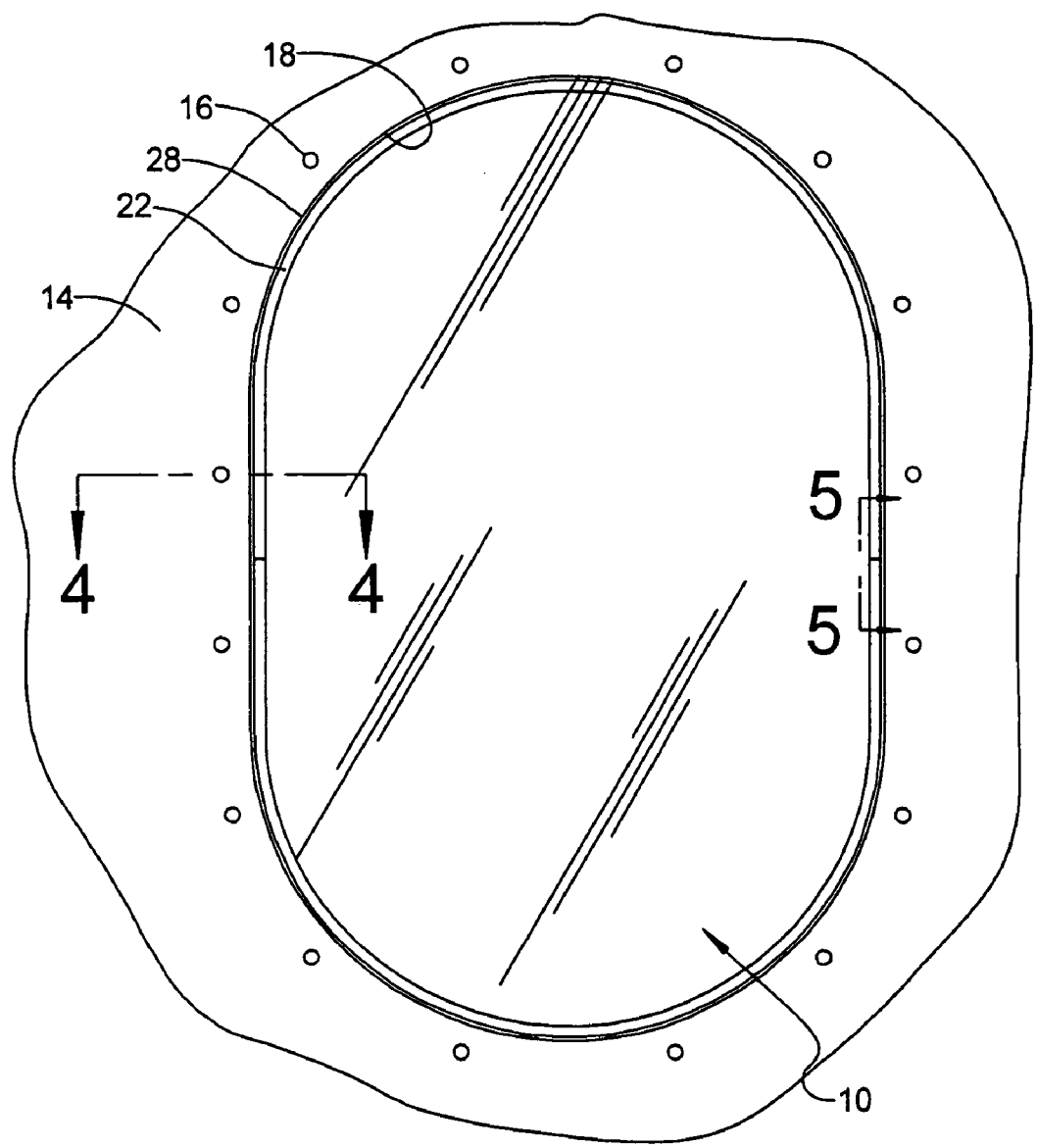
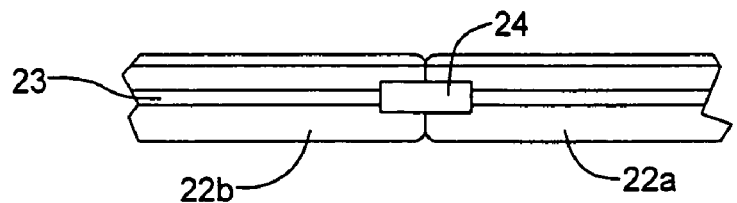

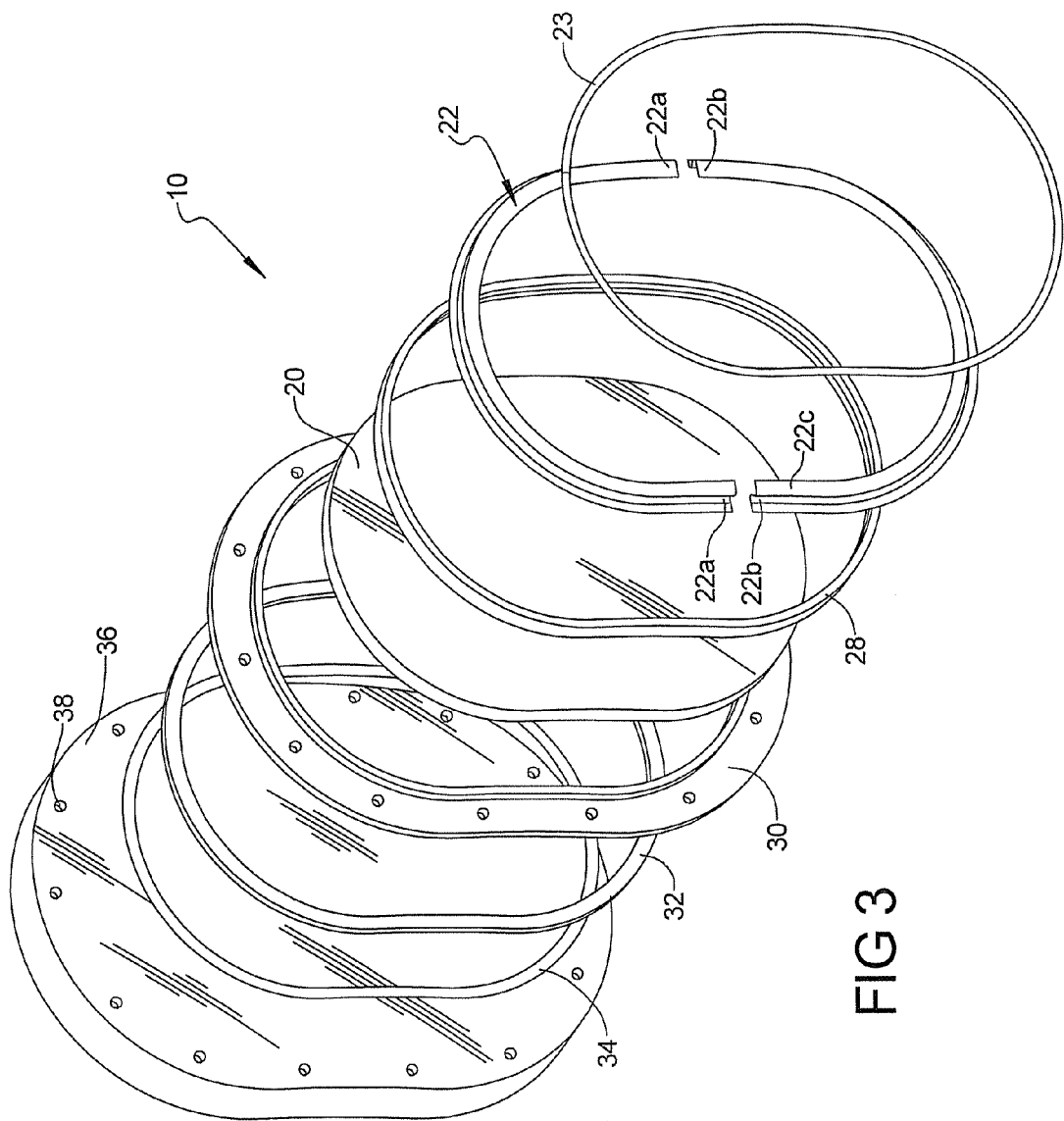

SEALED STRUCTURAL PASSENGER WINDOW ASSEMBLY AND METHOD OF FORMING SAME

FIELD OF THE DISCLOSURE

The present disclosure relates to window assemblies for mobile platforms, and more particularly to a window assembly incorporating a protective fairing.

BACKGROUND OF THE DISCLOSURE

Mobile platforms, and especially airborne mobile platforms (such as commercial aircraft), typically include openings in a fuselage for a plurality of windows. Traditionally, such window assemblies for mobile platforms utilize transparent polymers in various shapes to form a window. Such windows typically, however, require a relatively heavy support structure for supporting the window within the body portion of the mobile platform. With a commercial aircraft, the relatively heavy, high-strength support structure is used to support the window panel within an opening in the structural skin of the aircraft. The support structure often includes forgings and stringers, with the support structure being designed to strengthen the skin panel at the area around the opening where the window is to be positioned. The support structure, therefore, can add significant weight to the overall structure with which it is being used. With various forms of airborne mobile platforms, and especially with commercial and military aircraft, minimizing the weight of the mobile platform is an important consideration. Minimizing weight can directly enhance the fuel efficiency of the mobile platform.

It would be desirable if a generally transparent composite material could be incorporated for use in a window assembly for a mobile platform to thus make use of the relatively light weight and structural strength that composite materials offer. However, when using such composite materials in an application for a aircraft window, it would also be highly desirable to provide some form of thermal, as well as hazard, barrier over the composite material. Such a barrier could function to thermally insulate the composite window material from significant ambient temperature changes during operation of the mobile platform. The barrier could also protect the composite window material from impacts from foreign objects that strike the mobile platform window areas during operation of the mobile platform.

SUMMARY OF THE DISCLOSURE

The present disclosure is directed to a window assembly for use on a mobile platform. The disclosure is especially well suited for use on commercial and military aircraft where reducing the overall weight of the mobile platform is an important goal or consideration.

In one implementation the window assembly comprises a window panel formed from a composite construction. The window panel is positioned over an opening in a body portion of the mobile platform. If the mobile platform is a commercial or military aircraft, then the opening is formed in a fuselage of the aircraft. A fairing in the form of a panel is placed within the opening in the body portion over an outer surface of the window panel. A seal is interposed between the exterior surface of the window panel and an interior surface of the fairing to form a sealed air gap between the window panel and the fairing. A retainer assembly is used to engage a peripheral edge of the fairing and to support it fixedly relative to the body portion so that the retainer assembly and the fairing are generally flush with an outer surface of the body portion.

In one form the fairing comprises a thermally-tempered glass fairing. The retainer assembly includes a retainer clip and a lip-filler panel that cooperate to secure the fairing within the opening. In one implementation a window-to-fairing filler component is employed in between the sealing element and the inside surface of the fairing to further assist in spacing the inner surface of the fairing away from the exterior surface of the window panel.

In one implementation the retainer assembly includes a curved retainer clip and a lip-filler panel that engage one another to hold the fairing in place in the opening in the body portion, and against the window panel. A retainer seal element is pressed into the opening in between the retainer clip and a peripheral side edge of the body portion to further assist in holding the retainer clip against the peripheral edge of the fairing. In this embodiment, the lip-filler panel acts as a seal to seal the inner face of the window panel and the interior surface of the body portion of the mobile platform. In this implementation the fairing is formed by a thermally-tempered glass panel. A portion of the retainer assembly is bonded to a perimeter edge portion of the fairing to secure the fairing within the opening in the body portion. The tempered glass fairing also includes a protective polymer layer over its exterior surface.

The window assembly, in its various embodiments, operates to insulate the window panel from the significant thermal changes that would otherwise be experienced by the window panel when it is incorporated on a high-speed, airborne mobile platform such as a commercial or military aircraft. The sealed air gap also reduces the deflection of the fairing so that the fairing maintains an aerodynamic outer surface. The fairing also acts to protect the window panel from hazards (such as foreign objects) that impact the window area of the mobile platform during operation. The fairing thus enables a window assembly to be provided that allows the use of a light weight composite window panel while addressing the thermal and hazard considerations that need to be addressed when using such a composite window panel.

The features, functions, and advantages can be achieved independently in various embodiments of the present disclosure or may be combined in yet other embodiments.

BRIEF DESCRIPTION OF THE DRAWINGS

The present disclosure will become more fully understood from the detailed description and the accompanying drawings, wherein:

FIG. 1 is a perspective view of an aircraft incorporating a window assembly in accordance with the present disclosure;

FIG. 2 is an enlarged plan view of one of the windows of the aircraft of FIG. 1;

FIG. 3 is an exploded perspective view of the window assembly shown in FIG. 2;

FIG. 5 is a view of a portion of the split retainer clip and retainer cable in accordance with circle 5 in FIG. 3.

DETAILED DESCRIPTION

Figure 4:
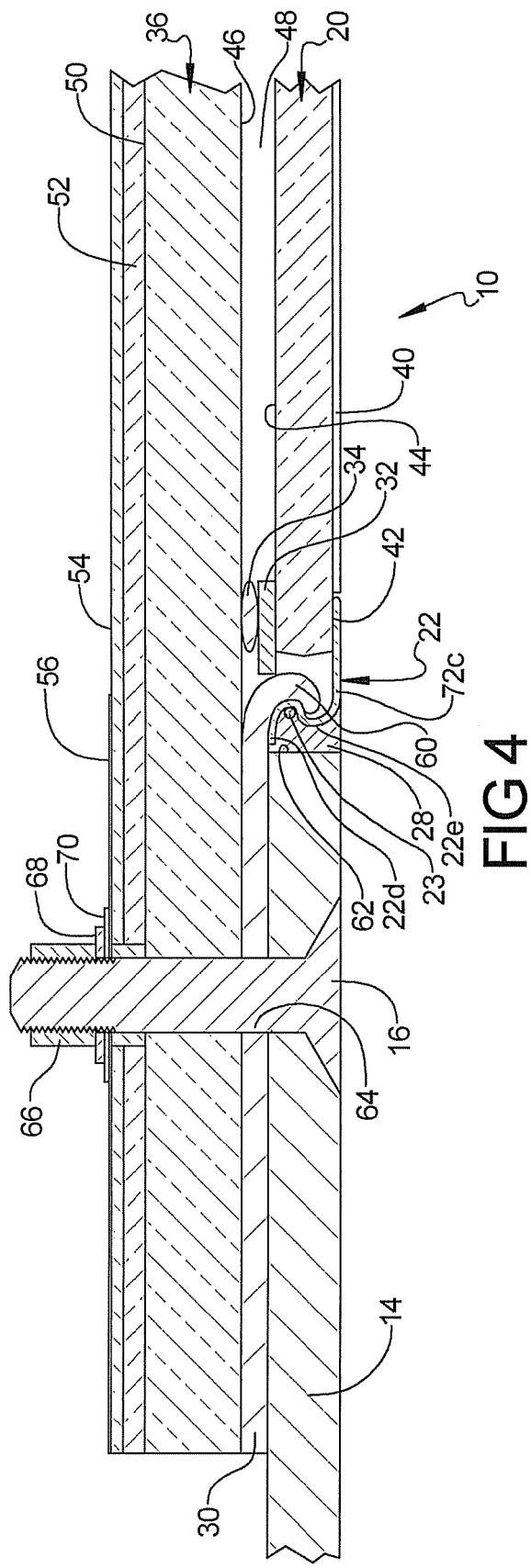
FIG. 4 is a cross-sectional view of the window assembly integrated into the fuselage of the aircraft of FIG. 1, taken in accordance with section line 4-4 in FIG. 2.

The following description of the embodiment(s) is merely exemplary in nature and is in no way intended to limit the inventiondisclosure, its application, or uses.

Referring to FIG. 1, a plurality of window assemblies 10, in accordance with an embodiment of the present disclosure, are illustrated as incorporated into a fuselage 14 of a mobile platform 12. In this example, the mobile platform is illustrated as a commercial aircraft; however, it will be appreciated that the window assembly 10 is not limited to use with only aircraft, but could be implemented on any form of airborne mobile platform (such as a rotorcraft), or even on other forms of mobile platforms, such as buses, trains, ships, etc. The structural and operational properties of the window assembly 10, however, are especially well suited for use with high-speed mobile platforms (such as commercial jet aircraft and military jet aircraft), where the window assembly 10 is exposed to significant changes in thermal conditions and air pressure, as well as impacts from foreign objects.

With brief reference to FIG. 2, one of the window assemblies 10 is shown in enlarged fashion. The window assembly 10 is held to the fuselage 14 by a plurality of fastening elements 16 spaced circumferentially around an opening 18 in which the window assembly 10 is installed. The fastening elements 16 extend through pre-formed openings in the fuselage 14.

Referring to FIG. 3, an exploded perspective view of the principal components of one preferred embodiment of the window assembly 10 is illustrated. A fairing 20 may be formed from a tempered section of glass. Alternatively, the fairing 20 may be formed from a glass-acrylic laminate or polycarbonate. A retainer clip 22 and a retainer cable 23 are used to secure the fairing 20 in the opening 18 of the fuselage 14, as will be described in greater detail in FIG. 4. The retainer clip 22, in one form, is formed as a "split" retainer clip having two pairs of free end portions, as illustrated in FIG. 3. The retainer cable 23 includes an independent deformable sleeve 24, as shown in FIG. 5, which is used to swage the free ends of the cable over the retainer clip 22 to hold the free ends 22a and 22b of the retainer clip 22 together around the fairing 20. The retainer cable 23 is preferably formed from stainless steel and has a thickness in the range of about 0.064"-0.032" (1.63 mm-0.80 mm).

With further reference to FIG. 3, the window assembly 10 includes a retainer seal 28, a lip-filler element 30, a window-to-fairing filler 32, an elastomeric elliptical seal element 34, and a window panel 36. The window panel 36 is formed from a composite construction that provides a generally transparent panel suitable for use as a window, but yet which has sufficient structural strength to function as a structural portion of the fuselage 14. The window panel 36 includes a plurality of openings 38 around its perimeter for receiving the fastening elements 16 (FIG. 2) during assembly of the fuselage 14.

Referring to FIG. 4, an assembled, representative portion of the window assembly 10 is shown. The fairing 20 may vary significantly in thickness; however, in one preferred form, it is between about 0.20"-0.30" (5.08 mm-7.62 mm), and more preferably about 0.235" (5.969 mm) in thickness. The fairing 20 preferably includes a protective polymer layer 40 formed on an outer surface 42 thereof. Polymer layer 40 may also vary in thickness; however, in one preferred form, it is preferably about 0.03" (0.762 mm) in thickness. The retainer seal 28 is preferably formed from rubber or silicon. The window-to-fairing filler 32 acts as a spacer and is preferably formed from high density polyethylene. The window-to-fairing filler 32 can vary in thickness; however, in one preferred form it is between about 0.05"-0.38" (1.27 mm-9.65 mm) in thickness. It is bonded via a suitable adhesive to a rear surface 44 of the fairing 20. The window-to-fairing filler 32 lays over the seal element 34 and sandwiches the seal element 34 against an outer surface 46 of the window panel 36. When the fairing 20 and the window-to-fairing filler 32 are secured against the seal element 34, a sealed air gap 48 is formed between the rear surface 44 of the fairing 20 and the outer surface 46 of the window panel 36.

With further reference to FIG. 4, a rear surface 50 of the window panel 36 also preferably includes a thin, vinyl fail-safe pane 52 having a thickness of about 0.05"-0.10" (1.27 mm-2.54 mm), and more preferably about 0.07" (1.78 mm). On top of the vinyl fail-safe pane 52 is an acrylic fail-safe pane 54 having a thickness of between about 0.025"-0.075" (0.635 mm-1.905 mm), and more preferably about 0.05" (1.27 mm). Disposed on top of the acrylic fail-safe pane 54 is a polysulfide brush coat 56 having a thickness of preferably about 0.005"-0.010" (0.127 mm-0.254 mm). While one preferred construction for the window panel 36 has been provided, it will be appreciated that the window assembly 10 can be used with a window panel having virtually any form of composite construction.

Referring further to FIG. 4, the retainer clip 22 can be seen to include a generally backwards "S" shaped configuration having portions 22c and 22d. A curved edge portion 60 of the lip-filler element 30 engages a curved section 22e of the retainer clip 22 in interlocking fashion. The retainer clip 22, in one preferred form, is formed from 0.032 gauge titanium. Retainer seal 28 is pressed into the cavity formed between the retainer clip 22 and a peripheral edge 62 of the opening 18 to abut portion 22d and to fill the void, thus allowing the skin-window transition to remain flush with the outer surface of the fuselage 14. Portion 22c extends over a small perimeter portion of the outer surface 42 of the fairing 20. The fastening element 16 extends through one of the openings 38 in the window panel 36, through holes 64 in the lip-filler element 30, and into engagement with a conventional retainer 66. Preferably a spacer 68 and a washer 70 are also interposed between the window panel 36 and the retainer 66.

The lip-filler element 30 is preferably formed from a composite material (e.g., graphite epoxy) The lip-filler element 30 preferably comprises a thickness of between about 0.05"-0.15" (1.27 mm-3.81 mm), and more preferably between about 0.07-0.11" (1.78 mm-2.8 mm). The fastening element 16 preferably comprises a titanium fastener having a diameter of between about 0.25"-0.375" (6.35 mm-9.53 mm), although it will be appreciated that the diameter of the fastening element 16 will need to be sized in accordance with the openings 64 and 38 in the lip-filler element 30 in the window panel 36, respectively.

The fairing 20 of the window assembly 10, in addition to the sealed air gap 48, provides the important advantage of thermally isolating the composite window panel 36 from the low temperatures that are typically encountered when the mobile platform is flying at its cruising altitude. The fairing 20, with its protective polymer layer 40, also provides a hazard barrier against airborne objects to prevent impact with the composite window panel 36. The air space formed by the sealed air gap 48 also reduces deflection of the fairing 20 at altitude to acceptable levels, which helps to insure that the fairing 20 forms an aerodynamic surface. The fairing 20 is also readily replaced by first removing the retainer cable 23, then the retainer seal 28 and the retainer clip 22. A new fairing 20 can then be installed, together with a new window-to-fairing filler 32, retainer cable 23, and a new seal 34 element.

The use of the fairing 20 thus enables a composite window panel to be used in the construction of a fuselage of a mobile platform. Since no metallic frame is needed for securing the composite window to the fuselage, this saves considerable weight, which in turn contributes to enhanced fuel economy for the mobile platform.

While various embodiments have been described, those skilled in the art will recognize modifications or variations which might be made without departing from the inventive concept. The examples illustrate the disclosure and are not intended to limit it. Therefore, the description and claims should be interpreted liberally with only such limitation as is necessary in view of the pertinent prior art.

What is claimed is:

1. A window assembly for an airborne mobile platform, comprising:
   a window panel positioned over an opening in a body portion of said mobile platform, said window panel having a composite construction with a plurality of openings around a periphery thereof for enabling said window panel to be secured to said mobile platform;
   a substantially transparent fairing positioned over an exterior surface of said window panel within said opening in said body portion;
   a seal interposed between a perimeter of an outer surface of the window panel and a perimeter of an inside surface of said fairing for spacing said fairing away from said window panel a predetermined distance, and further forming a sealed air gap between said window panel and said fairing which reduces deflection of said fairing; and
   a retainer assembly for retaining said fairing in position over said window panel fixedly relative to said body portion of said mobile platform, and with an exterior surface of said fairing generally flush with an exterior surface of said body portion; said retainer assembly including:
   a lip filler element interposed between said exterior surface of said window panel and an inside surface of said body portion, and such that an end of said lip filler element is positioned adjacent a peripheral edge of said fairing; and
   a retainer clip adapted to engage with said end of said lip filler element and also with a peripheral edge portion of said fairing so as to contact an outer surface of said fairing.

2. The window assembly of claim 1, further including a spacer interposed between said seal and said inside surface of the fairing.

3. The window assembly of claim 1, further including a retainer seal inserted between a perimeter edge surface of said fairing and a perimeter edge surface of said opening in said body portion of said mobile platform.

4. The window assembly of claim 1, wherein said lip filler element includes a curved edge portion for engaging a portion of said retainer assembly.

5. The window assembly of claim 1, further comprising a plurality of threaded fasteners arranged to extend through said openings in said periphery of said window panel and through said body portion.

6. The window assembly of claim 1, wherein:
   said end portion of said lip filler element comprises a curved end portion;
   said retainer clip comprises a curved shape generally in accordance with said curved end portion of said lip filler element, and
   said window assembly further including a retainer cable for engaging said retainer clip and holding said retainer clip to said lip filler element.

7. A window assembly for an airborne mobile platform, comprising:
   a composite window panel positioned over an opening in a body portion of said mobile platform, said window panel including a plurality of openings arranged about its periphery for enabling said window panel to be secured to a portion of said mobile platform and to form a structural portion of said mobile platform;
   a substantially transparent, thermally tempered glass fairing positioned over an outer surface of said window panel within said opening in said body portion;
   a sealing assembly for securing said fairing in place over said outer surface of said window panel, and fixedly supporting said fairing within said opening in said body portion so that an outer surface of said fairing is generally flush with an outer surface of said body portion, and forming a sealed air gap between said outer surface of said window panel and an inner surface of said fairing which reduces deflection of said fairing;
   said sealing assembly including:
   a curved retainer clip and a lip filler element, said curved retainer clip being fixedly secured to said glass fairing and having a curved section for engaging with a portion of said lip filler element to hold said fairing adjacent to said window panel;
   a window-to-fairing filler element is disposed adjacent a peripheral edge of said fairing, and between said inner surface of said fairing and said outer surface of said window panel;
   said curved retainer clip being fixedly secured to said peripheral edge of said fairing; and
   said lip filler element having a planar portion adapted to rest against an inner surface of said body portion and to circumscribe said opening, and a curved portion adapted to engage with said curved retainer clip.

8. The window assembly of claim 7, wherein said sealing assembly further comprises a seal element interposed between said window-to-fairing filler element and said outer surface of said window panel.

9. The window assembly of claim 8, wherein said seal element comprises an elliptically shaped seal.

10. The window assembly of claim 7, wherein said sealing assembly further comprises a retainer seal element disposed between said curved retainer clip and an edge surface of said opening in said body portion to assist in securing said fairing over said window and sealing a gap formed between said curved retainer clip and said peripheral edge of said opening.

11. The window assembly of claim 7, further comprising a plurality of structural fasteners disposed in said body portion around and adjacent said opening, for extending through said body portion and through said openings in said periphery of said window panel for securing said window panel to said body portion.

12. The window assembly of claim 7, wherein said curved retainer clip comprises a curved, titanium retainer element having a split, and a retainer cable for securing said curved retainer clip around said peripheral edge of said fairing.

13. The window assembly of claim 7, wherein a portion of said curved retainer clip is bonded to an outer surface of said fairing.

* * * * *

UNITED STATES PATENT AND TRADEMARK OFFICE
CERTIFICATE OF CORRECTION

PATENT NO. : 7,578,474 B2  Page 1 of 1
APPLICATION NO. : 11/143287
DATED : August 25, 2009
INVENTOR(S) : Balsillie et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 502 days.

Signed and Sealed this

Seventh Day of September, 2010

David J. Kappos
*Director of the United States Patent and Trademark Office*